May 24, 1960  A. L. G. PELLETIER  2,938,115
DETECTING AND SAFETY DEVICE
Filed Dec. 8, 1958
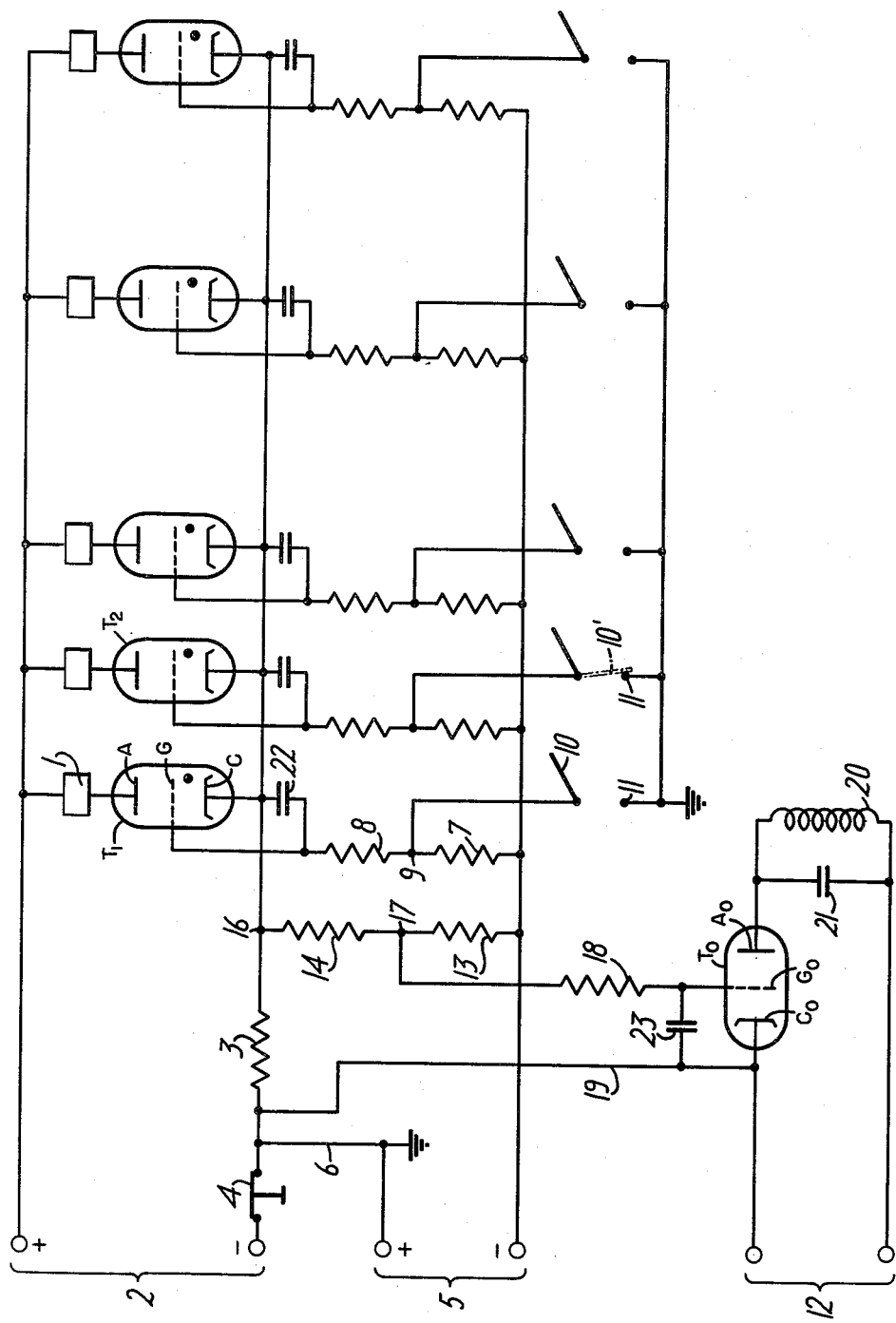

United States Patent Office 2,938,115
Patented May 24, 1960

2,938,115

DETECTING AND SAFETY DEVICE

Albert Louis Gabriel Pelletier, Epinal, France, assignor to Comptoir de l'Industrie Cotonniere, Etablissements Boussac, Paris, France, a French company Filed Dec. 8, 1958, Ser. No. 778,873

Claims priority, application France Aug. 22, 1958

4 Claims. (Cl. 250—27)

The present invention has for its object a detecting and safety device having for its purpose to produce a safety operation, for instance the stoppage of a machine, consequent on the detection of any one of a number of phenomena which are liable to occur and to signal the nature of the phenomenon which has occurred.

To this end, the arrangement according to the invention includes, in combination, control means adapted to produce a predetemined operation, such as the stoppage of a machine, and detecting means including a plurality of detecting systems of which each is adapted to be brought, by a corresponding predetermined phenomenon, from an inoperative condition to an operative condition, the arrangement being such that any one of said detecting systems, when it is brought into its operative condition, remains in this condition, whatever may be the rate of progression of the phenomenon which has produced said change of condition and releases the above-mentioned control means, while preventing the operation of all the other detecting systems.

According to another feature of the invention, each detecting system includes a member sensitive to the phenomenon considered and a thyratron tube fed with direct current and the control grid or one of the control grids of which is held normally at a tube-locking voltage, the energization of the sensitive member by the corresponding phenomenon releasing said thyratron.

According to a further feature of the invention, the anodic circuits of all the thyratrons have a common section through which the current flows at the moment of the release of any thyratron, the passage of current through said common section starting the operation of the control means.

According to still another feature of the invention, the control means include a further thyratron fed with alternating current and the control grid or one of the control grids of which is held normally at a locking voltage, the passage of current through said common section for the thyratron circuits of the detecting systems ensuring the release of said further thyratron forming part of the control means.

Further features and advantages of the invention will appear in the reading of the following description, reference being made to the accompanying drawing, the single figure of which is a wiring diagram of an arrangement according to the invention.

The invention will be disclosed hereinafter in its application to a stopping motion fitted on a warping frame. It has then for its purpose to detect any broken thread and to stop the machine thereupon.

The arrangement illustrated includes a number of thyratrons T1, T2, etc., associated each with a thread or group of threads to be controlled and including each an anode A, a cathode C and a control grid G. The anode circuit of each thyratron includes a visual signal 1.

The thyratrons T1, T2, etc. are fed in parallel by a supply of direct current 2. A resistance 3 is arranged in the cathodic lead section common to all the thyratrons. Furthermore, a pusher knob 4 which is normally closed is arranged in this common cathodic lead section, for a purpose to be disclosed hereinafter.

The grids G of all the thyratrons T1, T2, etc., are held normally at a negative locking voltage by the supply of another D.C. voltage 5 the positive terminal of which is connected, through the lead 6, with the negative terminal of the anodic supply 2, while its negative terminal is connected with the grids G individually, through the agency of a system of two resistances 7 and 8 inserted in series.

The connecting point 9 between the resistances 7 and 8 is connected with a stop motion pin 10 cooperating with a contact piece 11, which is earthed, the earth being also connected with the negative terminal of the supply 2 and the positive terminal of the supply 5. The pin 10 is held by the corresponding thread in the position illustrated in the drawing for which it is spaced apart from the contact piece 11.

The diagram includes furthermore a thyratron To forming part of the control means and comprising an anode Ao, a cathode Co and a control grid Go. The thyratron To is fed by a supply of alternating current 12, the grid Go is held normally at a locking voltage by a system of two resistances 13 and 14 inserted in series between the negative terminal of the supply 5 and the connecting point 16 between the resistance 3, on the one hand, and the cathodes C of the successive thyratrons T1, T2, etc., on the other hand.

The connecting point 17 between the resistances 13 and 14 is connected with the grid Go through the agency of a protecting resistance 18. The cathode Co of the thyratron To is connected, by a lead 19, with the positive terminal of the supply 5.

The anode circuit of the thyratron To includes the winding 20 of a relay adapted to actuate a circuit-breaker which is not illustrated. The winding 20 is shunted by a condenser 21 adapted to prevent the vibrations of the relay which are liable to arise as a consequence of the feeding of the winding with an undulating current.

Condensers of a low capacity, respectively 22 and 23, are inserted between the grid and the cathode of each thyratron T1, T2, etc. and of the thyratron To, respectively, with a view to preventing any untimely release of the thyratrons by strays.

The arrangement described operates as follows:

When the warping frame works normally, the stopping motion pins 10 are held by the threads in the positions illustrated for which they are spaced with reference to the corresponding contact pieces 11. The thyratrons T1, T2, etc. and also the thyratron To are then locked since their control grids remain at a negative potential.

At the moment of the breaking of a thread, for instance of the breaking of the thread associated with the thyratron T2, the corresponding pin 10 drops so as to come into contact with the contact piece 11, as illustrated in dotted lines at 10'. Through the establishment of said contact, the grid of the thyratron T2 is brought to the potential of its cathode so that the latter is fired.

The anodic current of the ignited thyratron T2 releases the visual signal 1 associated with said thyratron, which visual signal may be constituted by a lamp, a pivoting flap, or else it may be associated with, or replaced by, an acoustic signal. Furthermore, the current passes through the resistance 3 common to all the detecting thyratron circuits and it produces, across the terminals of said resistance, a drop in voltage which makes the potential of the grid Go of the thyratron To less negative whereby the latter is also fired. The anode current of said thyratron energizes then the relay 20, which leads to a stoppage of the warping frame through the agency of the circuit-breaker, which is not illustrated, actuated by said relay.

During the stoppage of the warping frame, all the other stopping motion pins 10 come into contact with their co-operating contact pieces 11, since the tensioning of all the warp threads ceases when the machine stops. The closing of said contacts cannot lead, however, to the firing of the other thyratrons T1, etc., since the drop in voltage produced across the terminals of the resistance 3 by the cathodic current of the thyratron T2 brings the cathodes of all the thyratrons to a positive potential of a value such that their grids remain always negatively biased in spite of the closing of the contacts at 10, 11.

Since the thyratrons T1, T2, etc., are fed with direct current from the supply 2, a thyratron, having been once fired, remains ignited in spite of the subsequent modification of its grid potential. Consequently, the drop in voltage across the terminals of the resistance 3 remains operative whereby the thyratron To also continues being operative in spite of its being fed with alternating current from the supply 12.

In order to make the warping frame start again after repair of the broken thread, the circuit of the thyratrons T1, T2 is opened through a transient depression of the pusher knob 4. Since the grid potential of the thyratron T2, which has led to a signalling of the broken thread, has been rendered again negative, after the broken thread has been repaired, by the raising of the stopping motion pin, the thyratron is extinguished upon this breaking of its circuit by the pusher knob 4 and it remains extinguished when said knob is released. At the same time, the cutting out of the drop in voltage across the resistance 3, as produced by the deenergization of the thyratron T2, makes the grid potential of the thyratron To again negative, so that it ceases operating. It is then possible to make the warping frame start again through reenegagement of its circuit-breaker. The arrangement is now ready for further operation.

The preceding disclosure shows that the above arrangement produces a stoppage of the warping frame at the moment of the breaking of a thread, while signalling the individual thread which has produced said stoppage. It should be remarked that the advantages of the arrangement described consist chiefly in that:

The release of the sheet of threads at the moment of the stoppage of the warping frame does not cut out the signalling which allows locating the defective thread;

Said arrangement may operate with even imperfect pin contacts;

The reliability of operation is complete, since no spark can appear on said contact pieces, the current to be made or broken being extremely weak.

Of course, the embodiment described hereinabove and illustrated in the drawing is given solely by way of exemplification and by no means in a binding sense, and it is possible to modify in any suitable manner the shape, the nature, the arrangement and the connections of its components without unduly widening thereby the scope of the invention.

Thus, although the arrangement has been described in its application to a warping frame, it may serve, in a general manner, whenever any one of a plurality of contingent signals, adapted to be translated into variations of resistance adapted to control a gas-filled triode, is to produce a predetermined common operation, through the action of a relay or the working of an electronic tube, and whenever it is required furthermore to keep as a memory until it is wiped out by an operator, a trace of the actual signal which has produced said operation of the apparatus, and this even if, in the meantime, other signals have been transmitted.

In the more restricted field of safety of operation of a machine, each signal may for instance indicate when it arises a predetermined defect (insufficiency or excess of temperature, of pressure, of speed, etc.) and produce the stoppage of the machine or release an alarm signal, while showing out the nature of the defect which has produced the signal. Furthermore, the thyratrons may be provided with screen grids or other control or the like grids.

What I claim is:

1. A detecting and safety arrangement responsive to predetermined phenomena conditions comprising, detecting means including a plurality of detectors each shiftable by a corresponding predetermined phenomenon condition from an inoperative condition into an operative condition and connected to remain in said operative condition until purposely shifted back into its inoperative condition, individual sensing means connected to a respective detector for sensing the phenomena corresponding to the respective phenomena detected by the respective detectors, common control means connected to be energized by any one of said detectors upon assuming an operative condition to initiate a predetermined operation, and means connected to the detecting means to preclude rendering the remaining detectors operative in the event one of the detectors detects a predetermined phenomena condition and is shifted to an operative condition.

2. A detecting and safety arrangement responsive to predetermined phenomena conditions comprising, detecting means including a plurality of detecting thyratrons each including a cathode, a control grid and anode, a direct current supply, a circuit energied by said supply and connected to energize said thyratrons in parallel, means normally biasing the control grids of all the thyratrons to prevent firing thereof, a plurality of sensing members each repsonsive to the phenomenon condition to be detected by a corresponding thyratron, and operable to modify the bias of the grid of said corresponding thyratron upon occurrence of a predetermined phenomenon condition to thereby provide for the firing of the latter, common control means subjected to the action of any one of the thyratrons when fired to initiate a predetermined operation, and means to preclude rendering the remaining detectors operative in the event one of the thyratrons fires in response to a corresponding phenomenon.

3. A detecting and safety arrangement responsive to predetermined phenomena comprising, detecting means including a plurality of detecting thyratrons each including a cathode, a control grid and anode, a direct current supply, a circuit energized by said supply and connected to energize said thyratrons in parallel, and including a series resistance between the supply and the cathodes of the different thyratrons, means normally biasing the control grids of all the thyratrons to prevent operation thereof, a plurality of sensing members operably controlled individually by the phenomenon condition to be detected by a corresponding thyratron and upon operation by the phenomenon each being operable to modify the bias of the grid of a corresponding thyratron to thereby provide for the firing of the corresponding thyratron, common control means adapted to initiate a predetermined operation, means whereby the passage of current through said series resistance upon firing of one of the thyratrons operates said control means to produce said predetermined operation, and means to preclude rendering the remaining thyratrons operative in the event one of the thyratrons fires in response to a corresponding phenomenon.

4. A detecting and safety arrangement responsive to predetermined phenomena conditions comprising, detecting means including a plurality of detecting thyratrons each including a cathode, a control grid and anode, a direct current supply, a current energized by said supply and connected to energize said thyratrons in parallel, and including a resistance in series between the supply and the cathodes of the different thyratrons, means normally biasing the control grids of all the thyratrons to prevent operation thereof, a plurality of sensing members each operably controlled by a phenomenon condition to be detected by a corresponding thyratron and upon operation by the phenomenon each being operable to modify the bias of the grid of a corresponding thyratron to thereby provide for the firing thereof, another thyratron including a cathode, a control grid and an anode, means for biasing the control grid of the other thyratron to prevent operation thereof, means applying an alternating current to said other thyratron, means whereby the passage of current through the above-mentioned resistance upon firing of one of the plurality of thyratrons modifies the bias on the control grid of the further thyratron to provide for its firing, and means controlled by the other thyratron when fired to initiate a predetermined operation, and means to preclude rendering the remaining first-mentioned thyratons operative in the event one of the first-mentioned thyratrons fires in response to a corresponding phenomenon.

References Cited in the file of this patent

UNITED STATES PATENTS

| | | |
|---|---|---|
| 2,516,422 | Rockafellow | July 25, 1950 |
| 2,586,151 | Costello | Feb. 19, 1952 |